Feb. 4, 1930.  R. ROESSEL  1,745,643
ICE SCOOTER
Filed Oct. 18, 1927
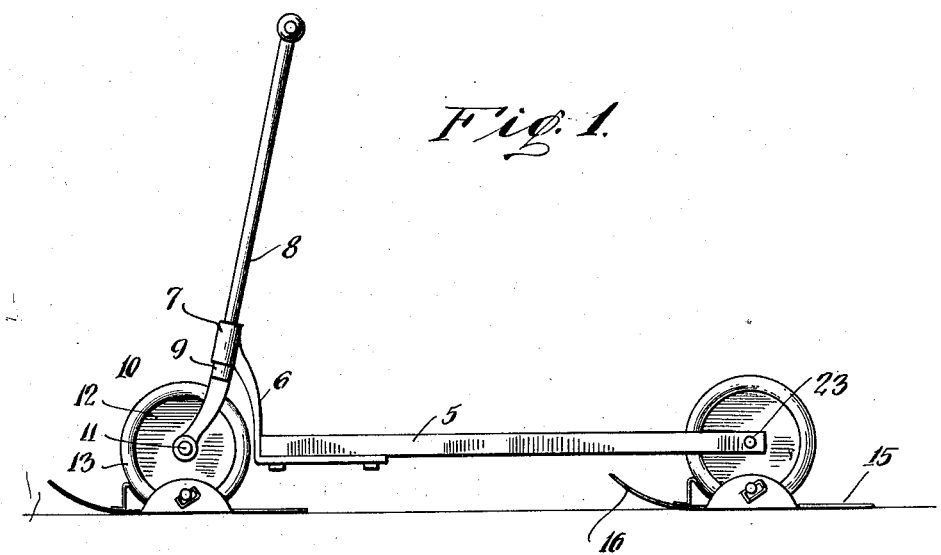
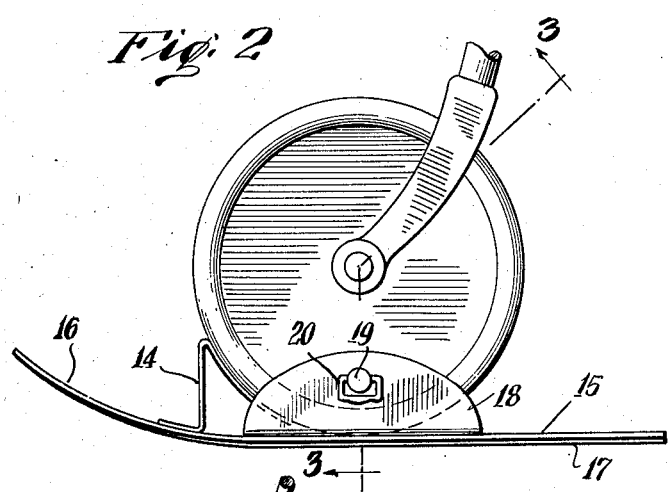
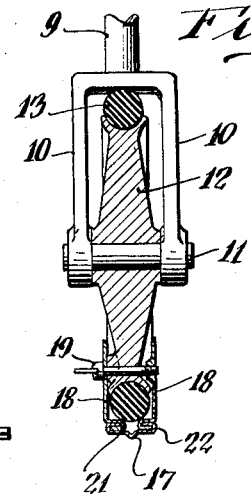
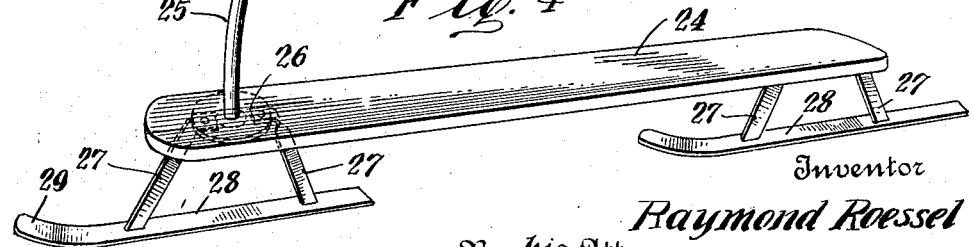
Inventor
Raymond Roessel
By his Attorney Patented Feb. 4, 1930

1,745,643

UNITED STATES PATENT OFFICE

RAYMOND ROESSEL, OF BROOKLYN, NEW YORK

ICE SCOOTER

Application filed October 18, 1927. Serial No. 226,866.

This invention relates to recreation devices and more particularly to such devices adapted for use on ice.

The object of the invention is to convert the conventional wheeled scooter into an ice sled, so that it may be used in the same manner for travel over ice.

A further object is to provide a simple and convenient attachment for readily changing a wheeled device into a vehicle which may be advantageously used for transportation over ice.

These and other like objects are accomplished by the novel construction, combination and arrangement of parts, hereinafter described and shown in the accompanying drawing, forming part of this disclosure, and in which:—

Figure 1 is an elevational view showing my attachment applied to a conventional scooter.

Figure 2 is a detailed view of Figure 1.

Figure 3 is a cross-sectional view of Figure 2, taken on line 3—3 of Figure 2.

Figure 4 is a perspective view of a modified form.

Referring to the drawings, a scooter is shown having a platform 5, to which is fixed, to the bottom thereof, a bracket 6 having a collar 7, through which extends the steering post 8, said steering post having an enlarged portion 9 to limit the downward movement of the collar 7.

Integral with the enlarged portion 9 are forks 10, in which the wheel 12 is pivoted by the pin 11, said wheel carrying a rubber tire 13.

My attachment comprises a body portion 15 made of sheet metal and having an upturned forward portion 16. The brace 14 is fixed to the forward portion 16 and has a curved portion conforming to the shape of a wheel 12, the latter being snugly positioned against the brace 14.

Mounted on the sheet metal runner 15 are the brackets 18 having apertures 20, through which pass the pin 19 to securely hold the wheel 12 in a fixed position against the brace 14.

As shown in Figure 3, the brackets 18 are made of sheet metal and have bent flanged portions 21 which are interlocked with the flange portions 22 of the runner 15, the latter being provided with a rib 17, which serves as a knife, as is well known in ice skates and other ice vehicles.

In Figure 4, the modified form has a platform 24 having a metal plate 26 mounted on its underside, to which is attached the sheet metal braces 27 having fixed thereto the metal runners 28, the latter being provided with upturned portions 29. The steering post 25 is fixed to the metal plate 26 and passes upwardly through the platform 24.

From the description given above, it is apparent that I have set forth details of an attachment which may readily be used to convert a scooter into an ice sled, which may be manipulated in the same manner as the scooter. It is apparent that the device herein presented will offer a means for extended entertainment of children during the winter months when the ground is covered with ice and snow and the usual scooter may not be used conveniently in its intended manner.

The modified form discloses an ice sled, which may be cheaply and readily made with a few metal parts and at the same time, it will be substantial and strong enough to stand up under rough uses.

From the foregoing, it will be seen that a simple device for this purpose has been disclosed in the preferred form of its embodiment, but it is not desired to restrict the details to the exact construction shown, it being obvious that changes, not involving the exercise of invention, may be made without conflicting with the scope of the appended claim.

Having thus described my invention, what I claim as new and desire to secure by Letters Patent, is:—

A means for attaching runners to the wheels of a scooter to convert the same into an ice sled, comprising braces on the forward parts of said runners curved to conform to the shape of the scooter wheels, brackets on said runners having apertures, pins passed through said apertures and the wheels for securely holding said wheels in a fixed position against said braces, flange portions on said runners, said flange portions being approximately S-shaped, correspondingly bent flanged portions on said brackets interlocked with the flange portions of said runners, and ribs on the underside of said runners adapted to engage an icy surface.

In witness whereof I have affixed my signature.

RAYMOND ROESSEL.